United States Patent [19]
Miyake et al.

[11] Patent Number: 6,034,934
[45] Date of Patent: Mar. 7, 2000

[54] DISC REPRODUCTION APPARATUS

[75] Inventors: Kunihiko Miyake; Yukio Shishido, both of Kanagawa; Hiroyuki Ito, Tokyo; Eiji Kumagai, Kanagawa, all of Japan

[73] Assignee: Sony Corporation, Tokyo, Japan

[21] Appl. No.: 09/021,087

[22] Filed: Feb. 10, 1998

[30] Foreign Application Priority Data

Feb. 13, 1997 [JP] Japan .................. P09-029355

[51] Int. Cl.⁷ ...................................... G11B 7/00
[52] U.S. Cl. .................. 369/54; 369/58; 235/462.01
[58] Field of Search .......................... 369/54, 58, 59, 369/47, 48, 49, 50; 235/462.01, 375, 494

[56] References Cited

U.S. PATENT DOCUMENTS 5,091,798  2/1992  Hibino .................... 359/209

*Primary Examiner*—Muhammad Edun
*Attorney, Agent, or Firm*—Limbach & Limbach L.L.P.

[57] ABSTRACT

The present invention provides a disc reproduction apparatus capable of correctly and easily read out a bar code data without carrying out a strictly constant angular velocity control. The disc reproduction apparatus according to the present invention includes a measurement block for measuring an edge interval of a bar code signal extracted from reading a bar code data recording area on a disc and a decoder for using the edge interval values measured by this measurement block, so as to decode the bar code data. This decoder identifies each of the edge interval values with a corresponding bar interval according to a distribution of the edge values measured.

8 Claims, 7 Drawing Sheets

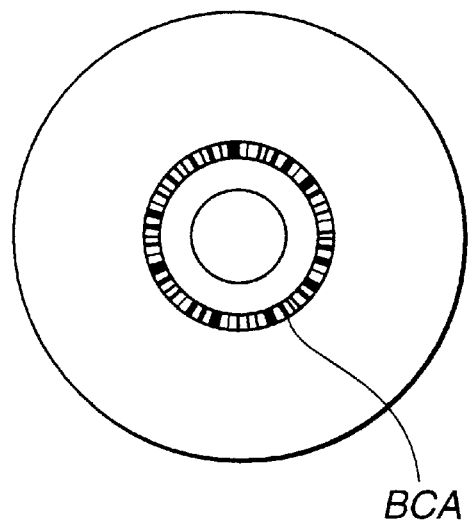
FIG.1
FIG.2A BAR CODE 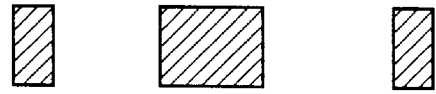
FIG.2B ELECTRICAL PULSE 
FIG.2C CLOCK 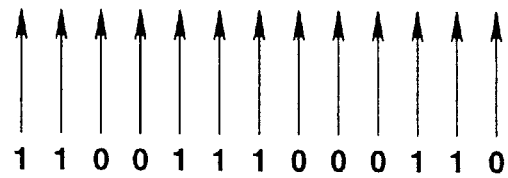

FIG.5A BAR CODE

FIG.5B ELECTRICAL PULSE (SUM SIGNAL PI)

FIG.5C EDGE INTERVAL

DISC REPRODUCTION APPARATUS

BACKGROUND OF THE INVENTION

1. Field of the Invention

The present invention relates to a disc reproduction apparatus capable of reproducing a data from a disc-shaped recording medium and in particular to reproducing a main data and a bar code data from the disc.

2. Description of the Prior Art

As an optical disc recording medium, a CD (compact disc) has been widely spread in various fields including music. The CD for music is normally a reproduction-dedicated medium, but a writable disc is also developed which is called CD-R (compact disc recordable).

On the other hand, a disc called DVD (digital versatile disc/digital video disc) is also developed as an optical disc recording medium which can preferably be used for multi-media application. The DVD is suggested to be used in a wide range of fields including a video data, audio data, computer data, and the like. Although the DVD has a size identical to the CD (with diameter of 12 cm), its recording capacity is remarkably increased by a reduced pitch of the recording track and the data compression technique.

This DVD has been suggested to be used as a reproduction-dedicated DVD-ROM, a DVD-R into which a data can be written once, and a DVD-RAM which can be re-written as many times as desired.

Moreover, in the development of these types of DVD, there has been suggested that each disc be provided with a BCA (Burst Cutting Area) as an area for recording a data which identifies the individual disc.

A code (signal) to be recorded in this BCA is recorded by using a YGA laser apparatus to eliminate an aluminium deposited surface, after a predetermined main data such as a video data is recorded in a disc which is a DVD-ROM for example. Consequently, the BCA code is recorded only on one side of the DVD-ROM.

As shown in FIG. 1, this BCA code consists of stripes of a bar code shape arranged in a circumferential direction of the disc, each stripe extending about k1 mm at 22.3 (+0/−0.05) mm to 23.50 (±0.05) mm from the center of the center hole. In this BCA, a code is recorded by the RZ modulation method and can be read out by an optical pickup of disc reproduction apparatus.

The operation related to reading of the bar code data from this BCA is a simple one in a disc system of the CAV method (rotation at a constant angular velocity).

That is, while a disc is rotated at a constant angular velocity, the optical pickup obtains a reflected light information from the BCA and from this reflected light information is obtained a pulse signal whose level at each moment is determined at a clock timing synchronized with the disc rotation.

For example, FIG. 2A shows an example of a bar code data and FIG. 2B shows an electrical signal pulse obtained from a reflected light from this bar code data. The level of this pulse is determined with a clock synchronized with the disc rotation as shown in FIG. 2C so that a data of "1" and "0" can be extracted according to the bar code data as shown at the bottom of FIG. 2C. By decoding the data string consisting of the extracted "1" and "0", it is possible to obtain the contents of the disc individual information recorded as the bar code data.

However, in a disc system of the CLV method (rotation with a constant linear velocity), it is impossible to carry out rotation of an accurate angular velocity and it is impossible to realize the bar code data reading method as shown in FIG. 2.

To cope with this, it is necessary to provide a mechanism and a circuit for controlling a constant angular velocity only for read out of the BCA.

However, addition of a CAV control system besides the CLV control system brings about a complicated circuit and mechanism, increase of the apparatus size, and increase of productions costs, accordingly it is desired to provide a technique which enables to preferably read out a bar code data without strictly controlling the angular velocity of the disc rotation.

SUMMARY OF THE INVENTION

It is therefore an object of the present invention to provide a disc reproduction apparatus capable of correctly and easily reading out a bar code data without carrying out a strictly constant angular velocity control of the disc rotation which complicates a reproduction apparatus of the CLV method and increases production costs.

The disc reproduction apparatus according to the present invention includes: rotation drive means for rotating a disc-shaped recording medium approximately at a constant rotation velocity; pickup means for reading a bar code data area on the disc-shaped recording medium so as to extract a bar code signal; measurement means capable of measuring an edge interval of the bar code signal; and decoding means for decoding the bar code data by using the edge interval values measured by the measurement means. The decoding means identifies each of the edge interval values with a corresponding bar interval according to a distribution state of the edge interval values measured.

The approximately constant rotation velocity is realized by, for example, switching an acceleration lasting for a predetermined period of time, to an inertia rotation state.

Moreover, the decoding operation using the edge interval values measured is realized as follows. According to a distribution state of the edge interval values measured, each of the edge interval values is identified with a corresponding bar code interval, so as to obtain a data string as the identification results (for example, "1" and "0").

BRIEF DESCRIPTION OF THE DRAWINGS

FIG. 1 shows a BCA (burst cutting area) in a DVD.

FIGS. 2A–2C explain a decoding process of the BCA in the DVD by a CAV type reproduction apparatus.

FIGS. 5A–5C explain a bar code data decoded by the disc reproduction apparatus according to the embodiment.

DETAILED DESCRIPTION OF THE PREFERRED EMBODIMENTS

Description will now be directed to a disc reproduction apparatus for a DVD-ROM according to the present invention with reference to the attached drawings according to the section titles given below. Note that three types of BCA bar code data decoding operation will be explained.

1. Reproduction apparatus configuration
2. Bar code data decoding method 1
3. Bar code data decoding method 2
4. Bar code data decoding method 3

1. Reproduction Apparatus Configuration

Figure 3:
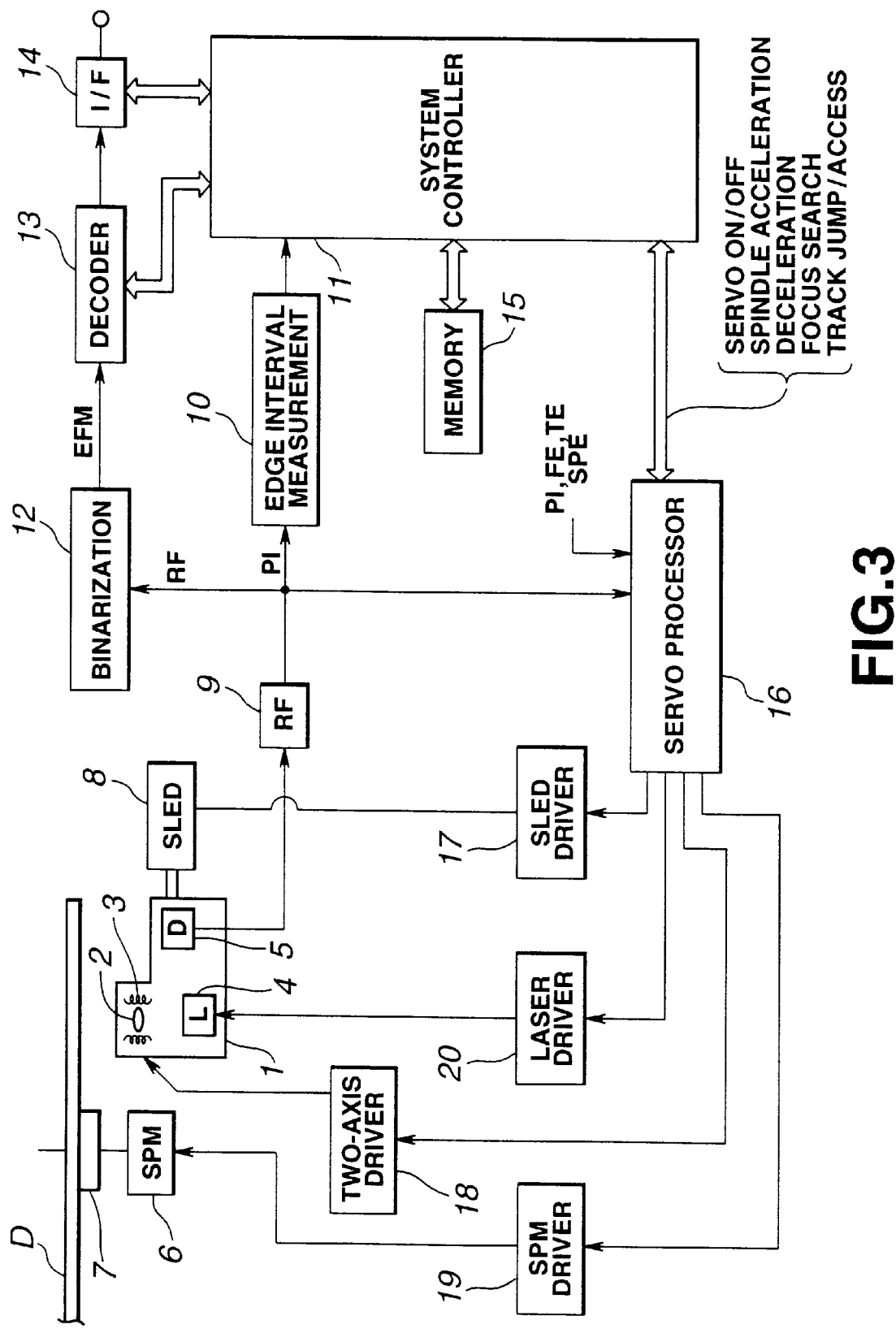
FIG. 3 is a block diagram shown a disc reproduction apparatus according to an embodiment of the present invention.

FIG. 3 is a block diagram showing an essential portion of the reproduction apparatus according to the present embodiment.

A disc denoted by D is a DVD-ROM which is mounted on a turn table 7 to be rotated at a constant linear velocity (CLV) by a spindle motor 6 during a reproduction.

Pickup 1 reads out a data (main data) stored in pit forms on the disc D.

The pickup 1 is provided with an optical system appropriate for the DVD-ROM. For example, a laser diode 4 serving as a laser source has an output laser having a center wavelength of 650 nm or 635 nm, and an objective lens 2 has NA=0.6.

The objective lens 2 is movably retained by a two-axis mechanism 3 so as to be movable in a tracking direction and in a focusing direction.

From the disc D, a data is read out by using the pickup 1. In the pickup 1, a reflected light information from the disc D is detected by a detector 5, generating an electrical signal according to the received light quantity, which signal is supplied to an RF amplifier 9.

The RF amplifier includes a current-voltage conversion circuit, amplifier circuit, a matrix calculation circuit, and according to the signal from the detector 5, creates a necessary signal such as an RF signal which is a reproduction data, a focus error signal FE for servo control, a tracking error signal TE, a pull-in signal PI which is a so-called sum signal.

Figure 4:
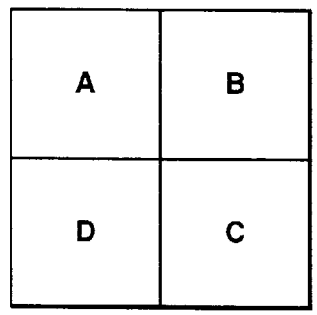
FIG. 4 explains a four-division detector of the disc reproduction apparatus according to the embodiment.

FIG. 4 shows the detector 5 consisting of detection blocks A, B, C, and D. In this case, the focus error signal FE is generated using the outputs from the detection blocks A, B, C, and D by calculating (A+B)−(B+D). The pull-in signal PI=(A+B+C+D).

The tracking error signal TE can be created by providing a side spot detector consisting of detection blocks E and F separately from the four-division detector of FIG. 4, and calculating E−F, or it is also possible to create a push-push signal from the four-division detector.

The various signals created by the RF amplifier 9 are supplied to a binarization circuit 12, a servo processor 16, and a pulse edge interval measuring block 10 (hereinafter, referred to as an edge interval measurement block). That is, the reproduction RF signal from the RF amplifier 9 is supplied to the binarization circuit 12, whereas the focus error signal FE, the tracking error signal TE, and the pull-in signal PI are supplied to the servo processor 16, and the pull-in signal PI is further supplied to the edge interval measurement block 10.

The reproduction RF signal obtained in the RF amplifier 9 is binarized by the binarization circuit 12 into a so-called EFM+ signal (8–16 modulated signal) for supply to a decoder 13. The decoder 14 carries out EFM+ demodulation, CIRC decoding, and the like as well as CD-ROM decoding and MPEG decoding so as to reproduce the information which has been read from the disc D.

The data decoded is supplied via an interface block 14 to an externally connected apparatus such as a host computer.

The servo processor is supplied with the focus error signal FE and the tracking error signal TE from the RF amplifier 9 and a spindle error signal SPE from the decoder 13 or from a system controller 11, and from these signals creates various servo drive signals such as Focus, Tracking, Sled, and Spindle, so as to carry out a servo operation.

That is, according to the focus error signal FE and the tracking error signal TE, a focus drive signal and a tracking drive signal are generated for supply to the two-axis driver 18. The two-axis driver 18 supplies a focus coil and a tracking coil of the two-axis mechanism 3 in the pickup 1 with a current based on the focus drive signal and the tracking drive signal, thus driving the two-axis mechanism. With this, a tracking servo loop and a focus servo loop are formed by the pickup 1, the RF amplifier 9, the servo processor 16, and the two-axis driver 18.

Moreover, the servo processor 16 supplies the spindle motor driver 19 with a spindle drive signal created according to the spindle error signal SPE. The spindle motor driver 19, according to the spindle drive signal, for example, applies a 3-phase drive signal to the spindle motor 6 and carries out a CLV rotation of the spindle motor 6. Moreover, the servo processor 16 creates a spindle drive signal according to a spindle kick (acceleration)/brake (speed reduction) control signal from the system controller 11, so that the spindle motor driver 19 starts or stops the spindle motor 6.

The servo processor 16 creates a sled drive signal for supply to a sled driver 17, for example, according to a sled error signal obtained from a lower zone component of the tracking error signal TE and according to access control from the system controller. The sled driver 17, according to the sled drive signal, drives a sled mechanism 8. The sled mechanism 8 is a mechanism for moving the entire pickup 1 in the disc radial direction. The sled driver 17 drives the sled motor 8 according to the sled drive signal so that the pickup 1 is appropriately shifted.

The laser diode 4 in the pickup 1 is driven by a laser driver 20.

The servo processor 16, according to an instruction from the system controller 11, during a reproduction for example, makes to generate a laser drive signal for emitting a laser beam from the pickup 1, which signal is supplied to the laser driver 20. According to this signal, the laser driver 20 drives the laser diode 4 to emit a laser beam.

The aforementioned servo and decoding operations are controlled by the system controller 11 made from a microcomputer.

For example, operations such as reproduction start, end, track access, fast feed reproduction, fast backward reproduction, and the like are realized by the system controller 11 which controls the operations of the servo processor 16 and the pickup 1.

A memory 15 is used for storing various work data required for control operation by the system controller 11.

Furthermore, in this embodiment, the bar code data recorded in the BCA of the disc D is read out by the methods which will be detailed later. For this, the edge interval measurement block 10 is provided, and the system controller 11 serves as a decoder of the bar code data.

As shown in FIG. 5, in a DVD system, the bar code data of the BCA is recorded with bars arranged at an interval of 1T or 2T. For a bar code pattern shown in FIG. 5A, it is assumed that a pull-in signal PI shown in FIG. 5B is obtained. If the time of the pulse edge interval is measured, 1T or 2T can be determined as a bar code data. According to this determination, the data is decoded.

For this, the edge interval measurement block 10 is provided with a counter which is reset/started by an edge of the pull-in signal PI and a circuit system for outputting to the system controller 11 a count value immediately before a reset.

That is, when reading a bar code data, the time value (count value) as the edge interval of the pull-in signal PI is successively measured by the edge interval measurement block 10 for supply to the system controller 11. It should be noted that the count value is supplied as a digital data having a predetermined number of bits to the system controller 11.

However, the edge interval value is varied according to the disc angular rotation velocity. That is, in a reproduction having no CAV rotation servo system as in FIG. 3, for the same 1T interval, for example, the edge interval value measured is changed according to the fluctuation of the rotation velocity. Consequently, the system controller 11 cannot determine whether the bar code data is "1T" or "2T" from the edge interval value inputted.

To cope with this, in this embodiment, the system controller 11 determines whether a bar code data is "1T" or "2T" from an edge interval value measured by carrying out one of the processing examples (decoding methods 1 to 3) which will be detailed below.

2. Bar Code Data Decoding Method 1

Figure 6:
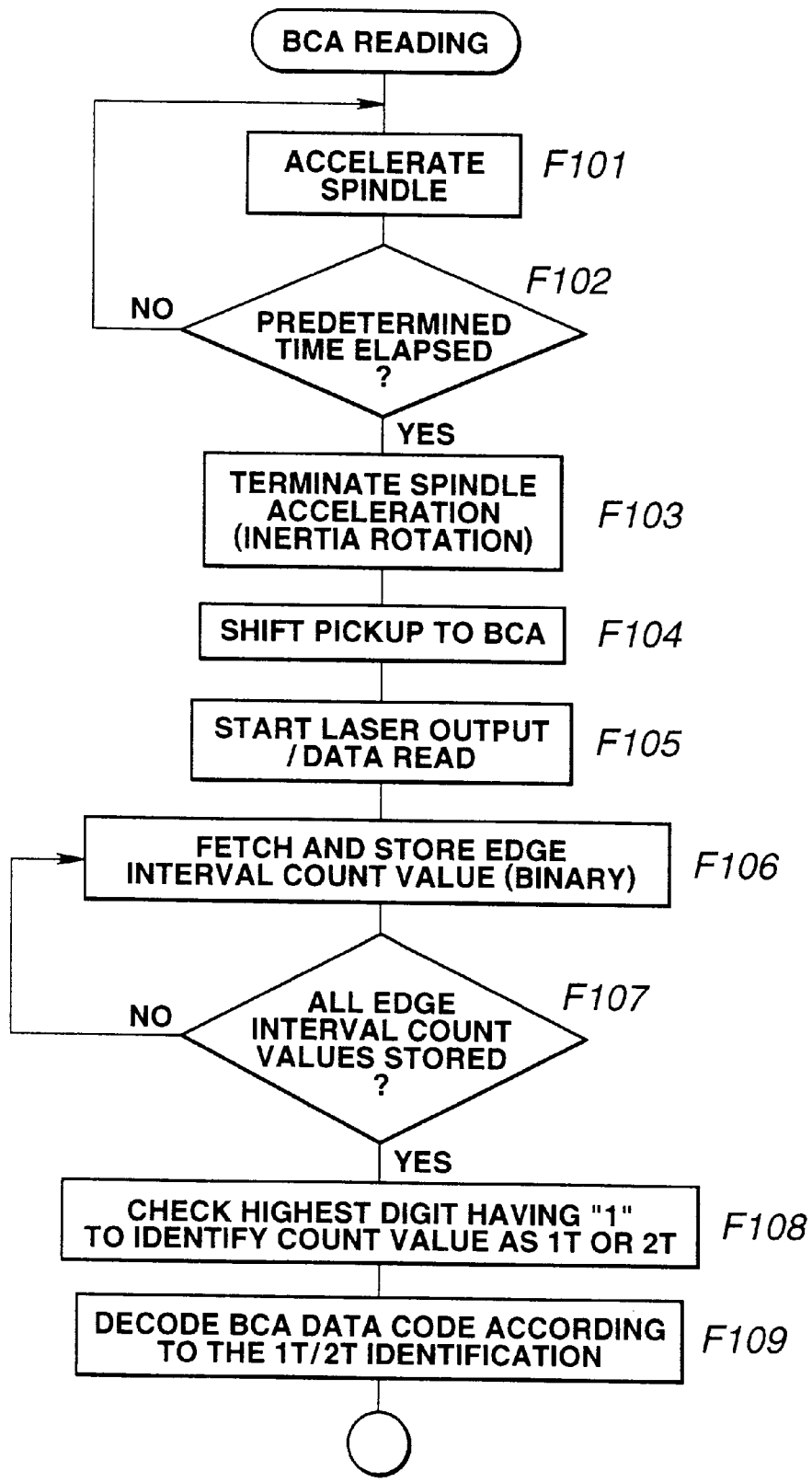
FIG. 6 is a flowchart showing a procedure carried out according to Bar code data decoding method 1 according to the embodiment.

FIG. 6 is a flowchart showing a control operation of the system controller 11 when reading a bar code data from the BCA of the disc D. For example, this processing is carried out when the disc D is mounted on a reproduction apparatus.

Firstly, in step F101, the system controller 11 transmits an instruction to accelerate the spindle to the servo processor 16 so as to start the spindle motor 6. According to this instruction, the spindle motor driver 19 is supplied with an acceleration pulse signal and the spindle motor 6 starts rotation and accelerates.

This acceleration lasts for a predetermined period of time. That is, the system controller starts a time count when the acceleration is started and in step F102, it is determined whether the predetermined period of time has elapsed. Consequently, until the predetermined period of time elapses, the acceleration continues in step F101. When it is determined that the predetermined period time has elapsed in step F102, control is passed to step F103 where the acceleration control of the spindle motor 6 is terminated. Note that in this process, no deceleration control is carried out to supply a brake pulse and the spindle motor 6 (and the disc D) continues its rotation according to the inertia.

Thus, by accelerating the spindle motor 6 for a predetermined period of time from a still state and after this, letting the disc D rotate by the inertia, it is possible to maintain the rotation velocity of the disc D almost constant for several turns. Note that the rotation cannot be maintained accurately at a constant velocity.

The predetermined time for acceleration is determined in advance according to an inertia moment of the disc D and the torque characteristic of the spindle motor 6.

Next, in step F104, the pickup 1 is shifted to a position corresponding to the BCA in the innermost circumference of the disc D, and in step F105, the pickup 1 starts reading of the BCA, staring laser beam emitting and reception of a reflected light.

It should be noted that in this flowchart, the operation of step F104 is carried out after the acceleration of the spindle motor 6 is terminated, but it is also possible to move the pickup 1 to the BCA read position simultaneously with the start of the acceleration of the spindle motor 6.

When the read operation of a bar code data of the BCA is started in step F105, the edge interval measurement block 10 starts counting a time value of an edge interval for a pull-in signal PI inputted, and successively outputs the time count as a binary value of a predetermined number of bits. According to this output, in step F106, the system controller reads the count value supplied and successively stores the count value in the memory 15. This processing continues until count values of all the edge intervals as a bar code data are fetched.

For example, when the disc D has made one turn after the data read is started and it is determined that the count values of all the edge intervals are fetched as the bar code data, control is passed from F107 to F108.

At this moment, the memory 15 contains the count values of all the edge intervals which are to be classified either as 1T or 2T as a bar code interval. However, as has been described above, the rotation velocity is not accurately constant, the count values stored corresponding to 1T or 2T are distributed as shown in FIG. 7.

In this case, a threshold value shown as Tth in the FIGURE is used to make a temporal division. If a count value is below the threshold value, the count value is determined to be 1T, and if a count value is above the threshold value, the count value is determined to be 2T.

Here, various classification methods can be considered using the reference of the threshold value Tth. For example, it is possible to set an average value of all the count values stored as the threshold value Tth. However, the frequency of the 1T pattern may not be identical to the frequency of the 2T pattern, which may cause an inaccurate classification.

Figure 7:
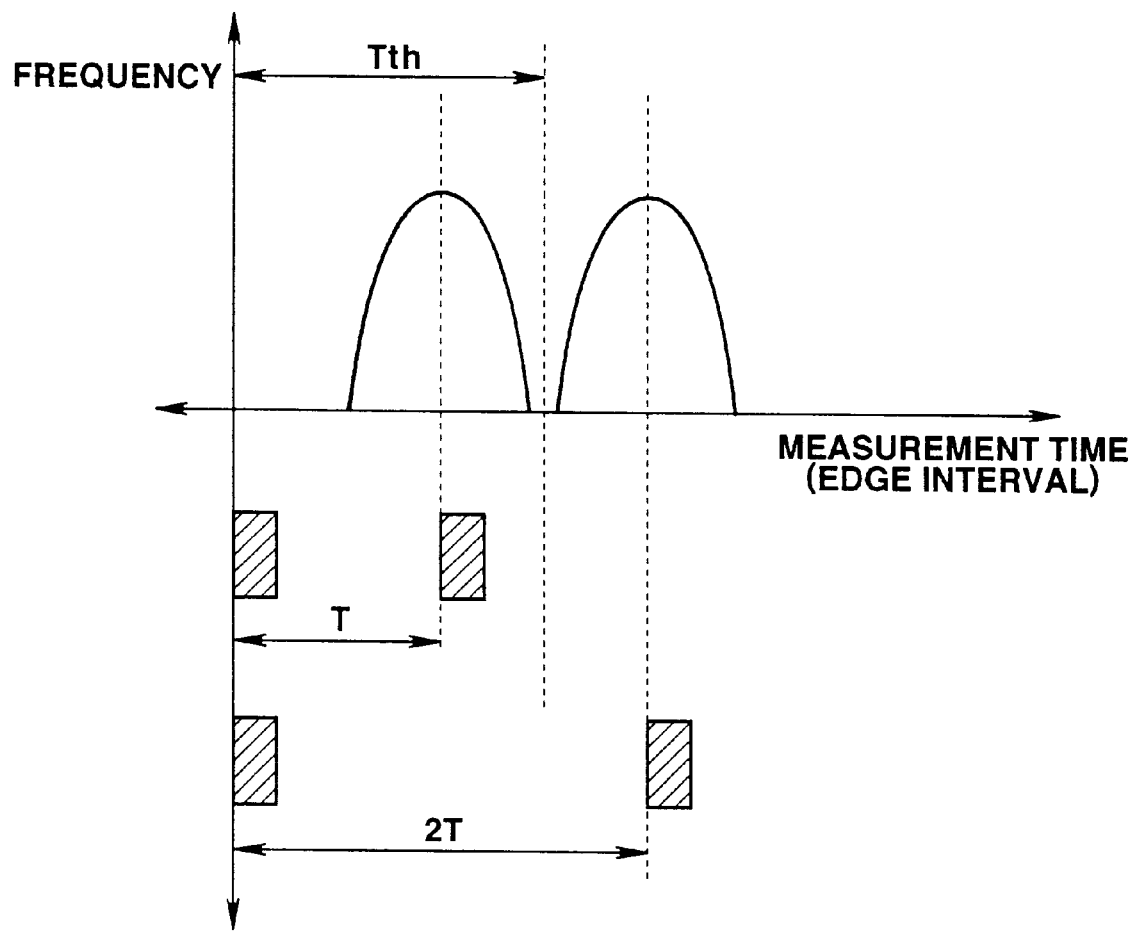
FIG. 7 explains the decoding operation principle by the disc reproduction apparatus according to the present embodiment.

To cope with this, the present embodiment utilizes the fact that the count values corresponding to the 2T pattern is basically twice as much as the count values corresponding to the 1T pattern, i.e., in the distribution of FIG. 7, the center of the count values corresponding to the 2T pattern is a value twice as much as the center of the count values corresponding to the 1T pattern.

In a case of a binary number, when a value is multiplied by 2, the highest bit having the value "1" is shifted to leftward by one digit. For example, in case of 4 bits, 1="0001", 2="0010", 4="0100", and 8="1000".

When considering such a feature of a binary number for classifying the values (binary n bits) stored as the edge interval count values, the 1T and 2T can be identified by checking the highest bit position (digit) having the value of "1". If the "1" is in a bigger digit, the count value can be determined to correspond to 2T, and if the "1" is a smaller digit, the count value can be determined to correspond to 1T.

For example, if it is assumed that count values C1, C2, . . . are obtained as C1="0110", C2="1011", C3="1001", C4="0101" . . . , then C1 and C4 in which the highest bit having "1" is the third digit can be determined to correspond to "1T", whereas C2 and C3 in which the highest bit having "1" is the fourth digit can be determined to correspond to "2T".

In step F108, classification according to the aforementioned principle is carried out to identify all the count values as 1T or 2T, thus obtaining a data string of "0" and "1" as the bar code data. For this data string, a decoding is carried out in step F109, so as to obtain the information as the bar code data stored in the BCA.

By using this method, it is possible to read a bar code data without strictly controlling the rotation velocity by providing a mechanism for CAV rotation control.

3. Bar Code Data Decoding Method 2

Figure 8:
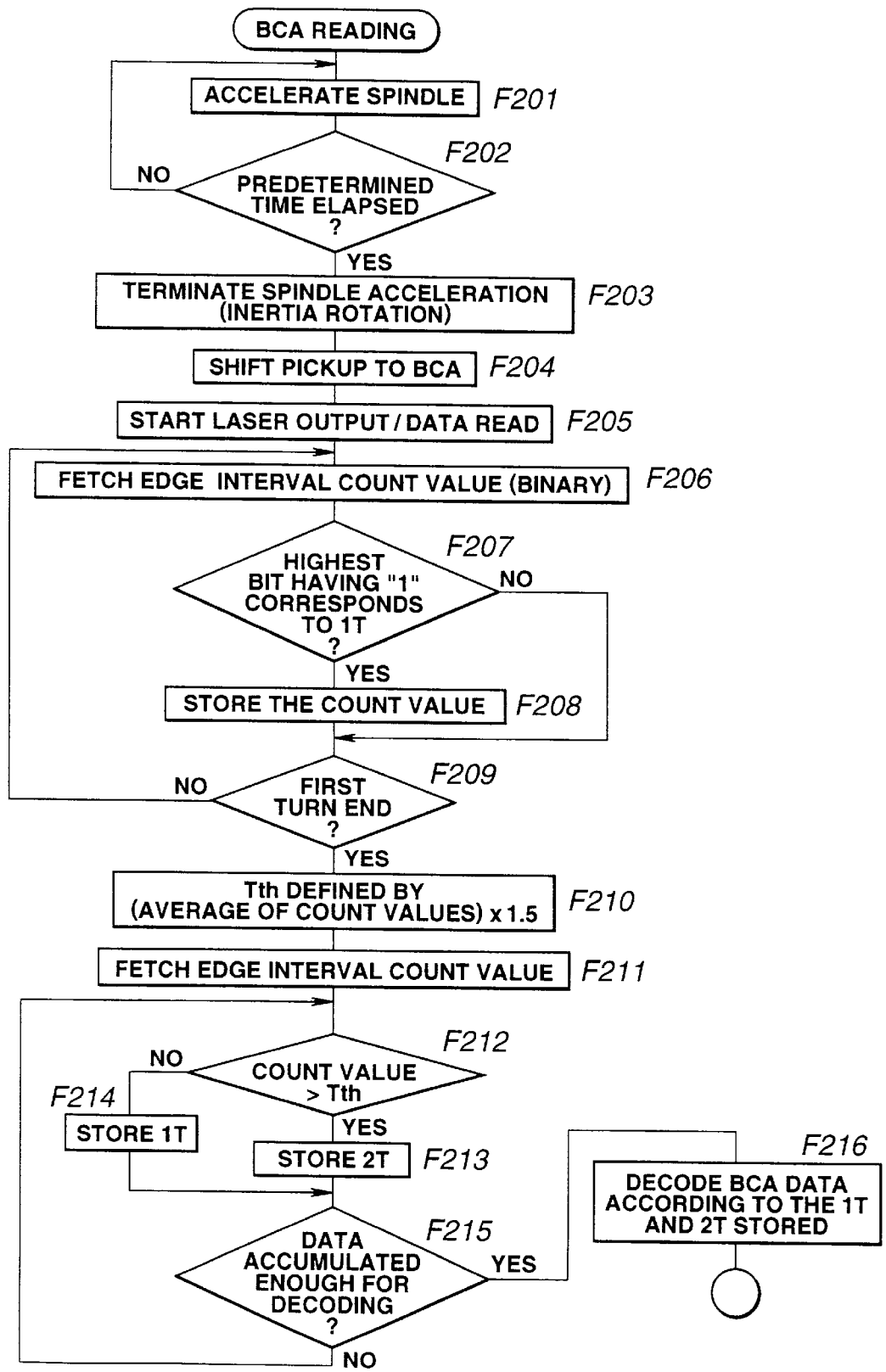
FIG. 8 is a flowchart showing a procedure carried out according to Bar code data decoding method 2 according to the embodiment.

FIG. 8 is a flowchart showing the second processing example of the system controller 11 as a bar code data decoding method.

It should be noted that steps F201 to F205 in the processing of FIG. 8 are identical to the steps F101 to F105 of FIG. 5, and their explanation will be omitted.

In step F205, the read operation of the bar code data from the BCA is started and the edge interval measurement block 10 starts counting a time vale of the edge interval for the pull-in signal PI inputted and successively outputs the count as a binary number. According to this, in step F206, the system controller 11 fetches the count value supplied.

Here, the system controller 11 checks the highest bit position (digit) having a value of "1" in the count value fetched in step F207. If the count value has "1" in a smaller digit, control is passed to step F208 and the count value fetched is stored in the memory 15.

On the other hand, if the checking of the highest bit position (digit) having the value of "1" results in that the count value has the "1" in a greater digit, the processing of step F208 is not carried out.

Here, the highest bit position having the value of "1", similarly in the aforementioned decoding method 1, serves as a reference to classify the count value to be 1T or 2T.

The processing of steps F207 and F208 continues until it is determined in step F209 that the disc D has made one turn after the data read is started and count values of all the edge interval have been fetched as the bar code data. In this processing, only the count values which are determined to correspond to 1T are stored in the memory 15.

It should be noted that if the disc rotation velocity during inertial rotation can be defined in a definite range, it is possible to predict the highest bit position (digit) having the value "1" for 1T and 2T, respectively, and accordingly, the decision of step F207 can be made at the first moment when an edge interval count value is fetched in this flowchart. However, in a case when the inertia rotation velocity cannot be defined in a definite range, the first several count values can be used as samples to define two samples each having the highest digit having the value "1" in a different digit so that a count value fetched after this can be determined whether to correspond to the sample having the smaller digit.

When the disc D has made one turn after the processing of step F206 and after is started and all the count values considered to correspond to 1T among all the edge interval count values as the bar code data have been stored in the memory 15, control is passed from step F209 to F210 where a calculation is carried out to determine an average value of the count values stored in the memory 15 and the average value obtained is multiplied by, for example, "1.5", to define a threshold value Tth.

Thus, the threshold value Tth is obtained from the count values supplied during the first one turn of the disc D, and during the second disc turn, actual decision is made whether the count value inputted is 1T or 2T.

That is, each time when a count value is fetched from the edge interval measurement block 10 in step F211, the count value fetched is compared to the threshold value Tth in step F212.

If the count value is found to be greater than the threshold value Tth, the count value is determined to correspond to "2T", and control is passed to step F213 where the data of "2T" is stored in the memory 15.

On the other hand, if the count value is found to be smaller than the threshold value Tth, the count value is determined to correspond "1T" and control is passed to step F214 where the data of "1T" is stored in the memory 15.

After executing the processing of this step F211 and after during one disc turn, the decision results of 1T and 2T for all the edge interval count values as the bar code data are accumulated as a data string in the memory 15.

Then, control is passed from F215 to F216 where the data string of 1T and 2T stored in the memory 15, i.e., a data string of "0" and "1" as the bar code data is decoded to obtain the information as the bar code data stored in the BCA.

With this decoding method, it is possible to read a bar code data without providing a mechanism for carrying out a CAV rotation control for n accurate rotation velocity control. Furthermore, in this case, during a first time duration (first one turn of the disc), only the count values which are considered to correspond to 1T are stored in the memory 15, and during a second time duration (second one turn of the disc), the decision result of 1T/2T which can be expressed in one bit is stored in the memory 15. Consequently, it is possible to reduce the memory capacity required in comparison to the aforementioned processing example 1 in which all the count values are stored.

4. Bar Code Data Decoding Method 3

Figure 9:
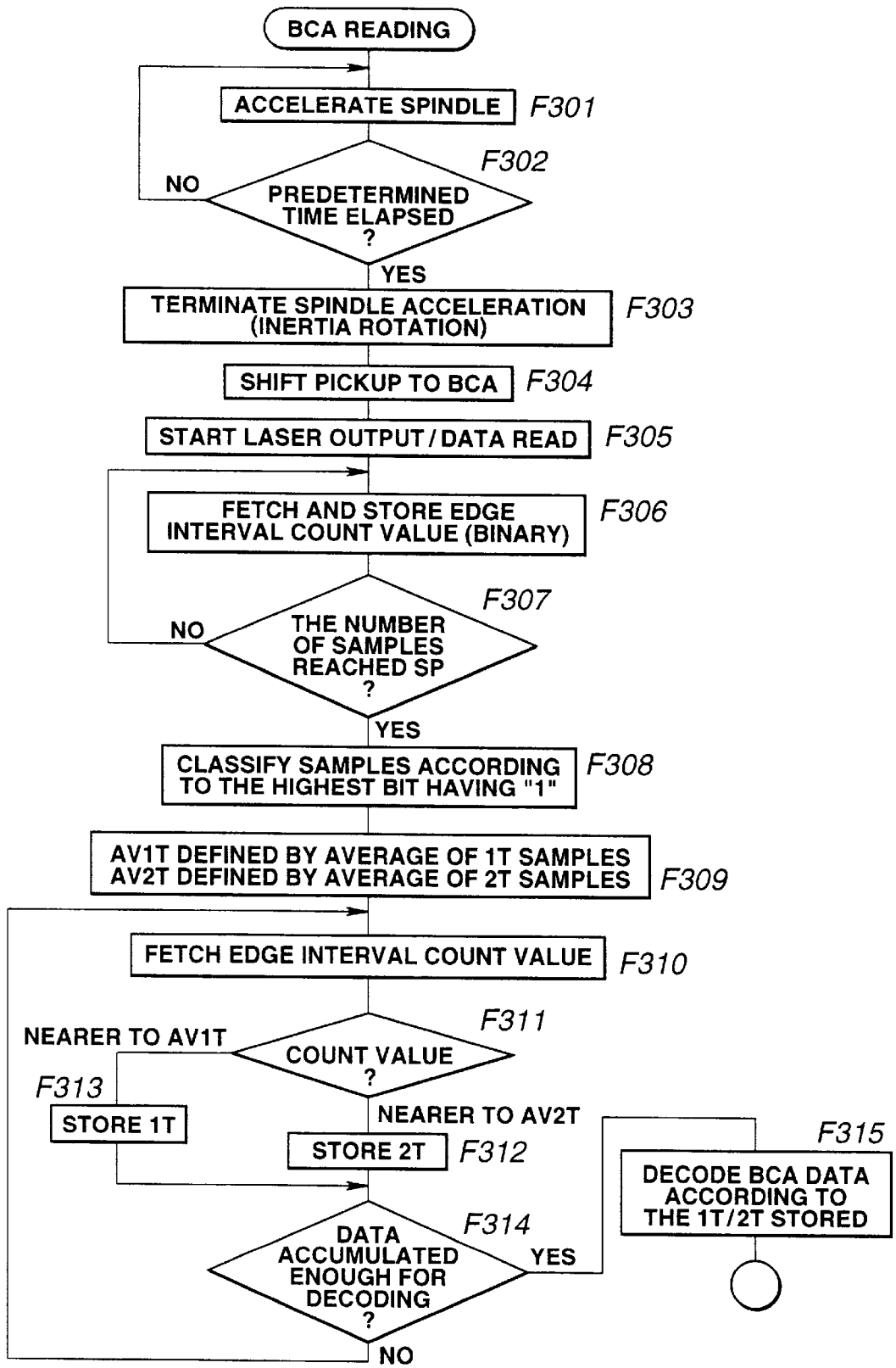
FIG. 9 is a flowchart showing a procedure carried out according to Bar code data decoding method 3 according to the embodiment.

FIG. 9 is a flowchart showing the third processing example of the system controller 11 as a bar code data decoding method.

It should be noted that steps F301 to F305 in the processing of FIG. 9 are identical to the steps F101 to F105 of FIG. 6, and their explanation will be omitted.

In step F305, read of a bar code data from the BCA is started and the edge interval measurement block 10 starts counting a time value of the edge interval for a pull-in signal PI inputted and successively outputs the time count as a binary number of a predetermined number of bits. In response to this, in step F306, the system controller 11 fetches the count value supplied and stores the count value in the memory 15.

Note that the processing of step F306 is carried out only until a predetermined number of samples SP of count values are fetched. When the processing of step F306, the fetch and storage of a count value is repeated by SP, control is passed from F307 to F308.

The number of samples SP represents a number which is sufficient to obtain sufficient number of samples (count values) corresponding to the 1T pattern and the 2T pattern as the bar code data. For example, the number of samples SP is by far a smaller number (the number of samples which can be obtained during a 1/M disc turn) than the number of samples which can be obtained during one disc turn.

When the memory 15 has stored SP-th samples of count values, control is passed to step F308 whether highest bit position (digit) having the value "1" is checked in the stored count values so as to classify the count values (samples). That is, if the highest digit having "1" corresponds to a smaller digit, the count value is determined to be a 1T sample, if the highest digit having "1" corresponds to a greater digit, the count value is determined to be a 2T sample.

Next, in step F309, an average value AV1T is calculated from all the count values which have been classified as the 1T samples. Moreover, an average value AV2T is calculated from all the count values which have been classified as the 2T samples.

Thus, the count values supplied during a first 1/M turn of the disc are stored ad classified so as to obtain the average values AV1T and AV2T. After this 1/M turn, actual decision is made whether a count value inputted is 1T or 2T.

That is, for each count value fetched from the edge interval measurement block 10 in step F310, the fetched count value is compared to the average values AV1T and AV2T in step F311, so as to determine whether the count value is nearer to the AV1T or AV2T.

More specifically, a subtraction is carried out between the fetched count value and the average value AV1T, and a subtraction is carried out between the fetched count value and the average value AV2T, so that the subtraction result having a smaller absolute value is selected.

When the count value is determined to be nearer to the average value AV2T, the count value is determined to correspond to 2T, and control is passed to step F312 where the data of "2T" is stored in the memory 15.

On the other hand, if the count value is determined to be nearer to the average value AV1T, the count value is determined to correspond to 1T, and control is passed to step F3313 where the data of "1T" is stored in the memory 15.

If this processing of step F310 and after is repeated for during one turn of the disc, the memory 15 can accumulate a data string of the decision results of 1T and 2T for all the edge interval count values as the bar code data.

Next, control is passed from F314 to F315 where a data string of 1T and 2T stored in the memory 15, i.e., a data string of "0" and "1" as the bar code data is decoded to obtain the information as the bar code data recorded in the BCA.

With this decoding method, it is possible to read a bar code data without providing a particular mechanism for carrying out a CAV rotation control for strict rotation velocity control. Furthermore, in this case, during a first time duration (during a 1/M turn of the disc rotation), the count values fetched are stored in the memory 15, but this lasts only until the number of samples SP is reached. During a second time duration (a second disc turn), the decision result data of 1T/2T which can be expressed by one bit is stored in the memory 15. Thus, it is possible to reduce the necessary memory capacity in comparison to the aforementioned processing example 1 in which all the count values are stored.

Moreover, the first time duration is defined as 1/M turn, which enables to reduce the period of time required for the decoding in comparison to the aforementioned processing example 2.

Thus, three example of decoding have been described but various other processing examples can be considered. In any case, the distribution of the count values fetched are used to obtain a reference value for classifying count values, which reference is used to determine whether a count value corresponds to 1T or 2T, enabling to preferably decode without carrying out a strict rotation velocity control.

The aforementioned explanation has been given for a case of DVD in which the bar code data has bar code intervals of 1T and 2T, but the present invention can be applied to a case of a bar code in which more interval types are used.

As has been described above, in the disc reproduction apparatus according to the present invention, the rotation drive means rotates a disc-shaped recording medium almost at a constant rotation velocity and the pickup means reads a data from a bar code data storage area of the disc-shaped recording medium for extracting a bar code signal whose edge interval is measured by the measuring means, so that a distribution of the edge interval values measured by this measuring means is utilized to identify a bar interval, thus enabling to decode a bar code data.

The present invention enables to give an effect of preferable decoding of a bar code data without carrying out a strictly constant rotation velocity. This method can be applied to a reproduction apparatus of CLV method for example, without providing a particular CAV mechanism or circuit for reading a bar code data. This leads to a simplified configuration and reduction in production costs.

Moreover, an approximately constant rotation velocity during decoding can easily be realized by switching the rotation acceleration for a predetermined period of time to an inertial rotation state. That is, this method can be realized without increasing the processing load of the control system.

What is claimed is:

1. A disc reproduction apparatus capable of reading a main data and a bar code data which is stored separately from said main data on a disc-shaped recording medium, said apparatus comprising:

pickup means for emitting a laser beam onto said disc-shaped recording medium and obtaining from a reflected light a signal corresponding to an information recorded on said disc-shaped recording medium;

rotation drive means for rotating said disc-shaped recording medium;

measuring means for measuring an edge interval of a bar code signal extracted by said pickup means through reading a bar code data recording area on the disc-shaped recording medium; and decoding means for decoding a bar code data recorded on the disc-shaped recording medium through identification of each edge interval value with a corresponding bar interval according to a distribution of edge interval values measured by said measuring means while said rotation drive means rotates the disc-shaped recording medium approximately at a constant rotation velocity and the pickup means read the bar code data recording area.

2. A disc reproduction apparatus as claimed in claim 1, wherein said decoding means makes said rotation drive means, after accelerating the rotation of the disc-shaped recording medium for a predetermined period of time, switch the rotation to an inertia rotation state so that the disc-shaped recording medium is rotated approximately at a constant rotation velocity.

3. A disc reproduction apparatus as claimed in claim 1, wherein in a case when the bar code data has a first bar interval and a second bar interval which is equal to said first bar interval multiplied by 2, said decoding means stores in memory means all the edge interval values measured for a bar code signal and determined whether each of the stored edge interval values corresponds to said first bar interval or said second bar interval, thus decoding said bar code data.

4. A disc reproduction apparatus as claimed in claim 3, wherein said decoding means checks the value of the highest bit of each of the edge interval values stored, so as to determine whether the interval value corresponds to said first bar interval or said second bar interval.

5. A disc reproduction apparatus as claimed in claim 1, where in a case when the bar code data has a first bar interval and a second bar interval which is equal to said first bar interval multiplied by 2, said decoding means defines a reference edge interval value corresponding to said first bar interval from a distribution of the edge interval values measured for a bar code signal during a first time duration, and according to said reference edge interval value, identifies each of the edge interval values measured for a bar code signal during a second time duration, as to correspond to said first bar interval or said second bar interval, so that the identification results are stored in memory means, according to which results, said bar code data is decoded.

6. A disc reproduction apparatus as claimed in claim 1, wherein in a case when the bar code data has a first bar interval and a second bar interval which is equal to said first bar interval multiplied by 2, during a first time duration during which a predetermined number of samples are obtained as the edge interval values, said decoding means uses a distribution of the edge interval values measured, so as to define a first reference edge interval value corresponding to said first bar interval and a second reference edge interval value corresponding to said second bar interval; and during a second time duration which follows said first time duration, said decoding means compares each of the edge interval values measured with said first reference edge interval value and said second reference edge interval value, so as to identify the edge interval value as to correspond to said first bar interval or said second bar interval and store the identification result, so that the identification results stored during this second time duration are used for decoding said bar code data.

7. A disc reproduction apparatus as claimed in claim 1, wherein said bar code data is a data recorded at a position of an inner circumference than said main data on said disc-shaped recording medium for individually identifying said disc-shaped recording medium.

8. A bar code data reproduction method for reproducing a bar code data recorded separately from a main data on a disc-shaped recording medium, said method comprising:

a step of rotating said disc-shaped recording medium approximately at a constant angular velocity;

a step of emitting a laser beam to a bar code data recording area on said rotating disc-shaped recording medium so as to read a bar code signal;

a step of measuring an edge interval of the bar code signal read out for a predetermined period of time and storing the measured values in a memory;

a step of utilizing a distribution of the edge interval values stored so as to identify a bar interval corresponding to each of the edge interval values; and a step of decoding said bar code data from said bar code signal according to the identification results.

* * * * *